June 20, 1967  G. J. HOLT ET AL  3,326,330
VEHICLE BRAKES
Filed Jan. 27, 1966  3 Sheets-Sheet 1
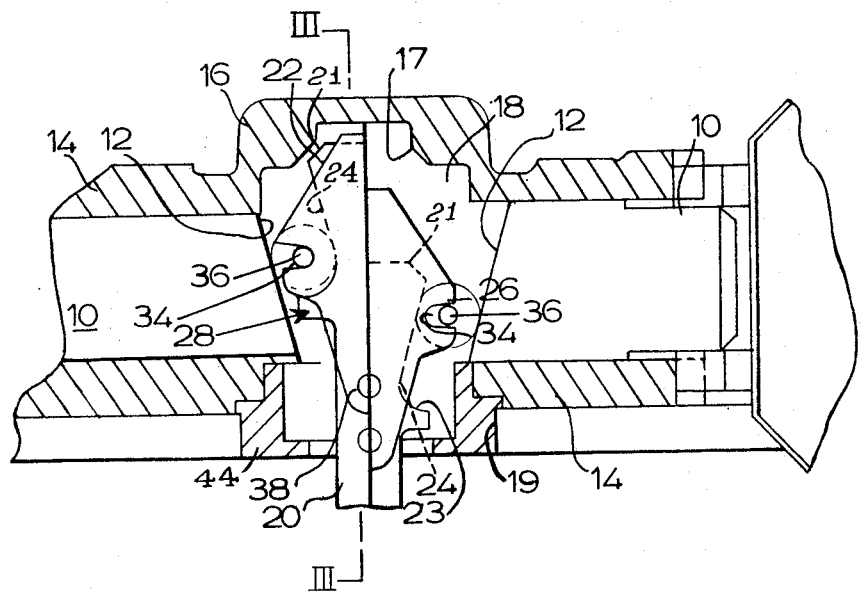
FIG 1
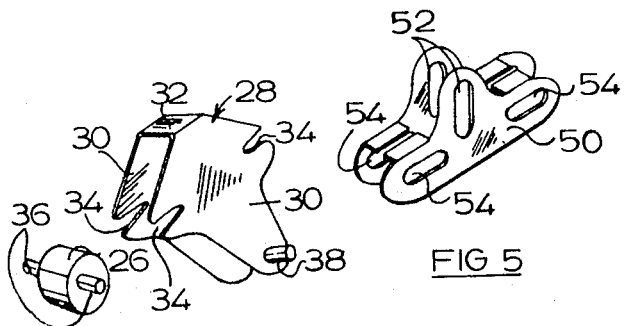
FIG 2
FIG 5
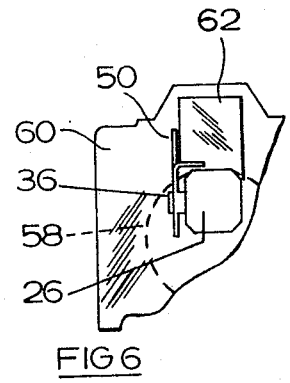
FIG 6

June 20, 1967  G. J. HOLT ET AL  3,326,330

VEHICLE BRAKES

Filed Jan. 27, 1966  3 Sheets-Sheet 2

United States Patent Office 3,326,330
Patented June 20, 1967

3,326,330
VEHICLE BRAKES
Gordon J. Holt, Yardley, Birmingham, and John L. Cullen, Langley, Stratford-on-Avon, England, assignors to Girling Limited, Tyseley, Birmingham, Warwickshire, England, a British company
Filed Jan. 27, 1966, Ser. No. 523,370
Claims priority, application Great Britain, Jan. 29, 1965, 3,922/65
3 Claims. (Cl. 188—78)

This invention concerns brakes and relates more particularly to vehicle brakes of the kind in which one or more friction elements is or are arranged to be displaced into engagement with a braking surface by wedge-type actuating means.

It is usual in wedge-type brake actuating means for one or more wedges or equivalent members to co-operate with balls or rollers arranged between the or each wedge and complementary surfaces on the associated friction elements, or on plungers or the like engaging the friction elements, in such a way that when the or each wedge is moved in a brake operating direction an operating movement is transmitted by the balls or rollers to the friction element or elements. The balls or rollers may be freely arranged between the wedges and the complementary surfaces, or, especially where rollers are concerned, they may be arranged in a cage member which is intended to maintain them in phase when not under actuating load, and also to maintain them aligned to roll in a preferred direction. However, difficulties are experienced in ensuring that the roller motion is a true rolling motion without sliding, that the rollers are reliably maintained in proper alignment with one another and, where the rollers are intended to operate a plurality of friction elements, that properly balanced operating forces are applied to those elements.

According to the present invention, in a vehicle brake assembly including a housing having wedge-type actuating means for displacing at least one friction element into an operative position and roller means interposed between a wedge member of the actuating means and the co-operating wedge surface of the friction element or of a plunger member associated therewith, the roller means is retained and guided by a cage member which is arranged to be movable in the direction of the wedge member and also to be capable of articulating about a pivot transverse to said wedge member. By virtue of the quasi-universal movement afforded to the cage member, the rollers are thus free to take up a balanced position relative to and to impart balanced operating forces to the friction elements, while being restrained in a properly aligned direction by the cage.

The invention will be described further, by way of example, with reference to the accompanying generally diagrammatic drawings, in which:

FIG. 1 is a fragmentary sectional elevation of a brake expander or actuating mechanism embodying the invention;

FIG. 2 is a detail of the roller cage;

FIG. 5 is a detail of the cage employed in the embodiment of FIG. 4;

FIG. 6 is a sectional detail taken on the line VI—VI of FIG. 4; and

Figure 3:
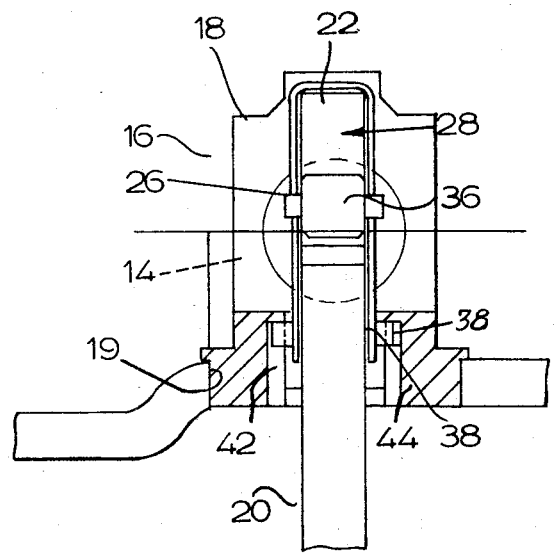
FIG. 3 is a section taken on the line III—III of FIG. 1.

In the brake actuating mechanism shown in FIGS. 1 to 3, a plunger member 10 having an inclined inner end surface 12 is slidably arranged in each of a pair of cylinders 14 extending in opposed directions from a support 16. The inner ends of the cylinders 14 open directly into an internal chamber 18 of the support 16 and an actuating member 20 having a wedge-shaped, free inner end 22, the inclined surfaces 24 of which are in spaced relation to the plunger surfaces 12, extends into the chamber 18, transversely between the plungers 10.

Between the inclined surfaces 12 and 24 are positioned rollers 26, which are retained and guided in a cage 28 more particularly shown in FIG. 2. As illustrated, the cage 28 comprises a pair of spaced, parallel cheeks 30 joined in a generally U-shaped configuration by a strap 32 and each formed with a pair of opposed, open slots 34 for receiving a spindle 36 of a roller. A pivot 38 extends perpendicularly outwardly from each cheek 30 of the cage at its free end region, remote from the strap 32.

It will be observed that, in the construction described above, the cage 28 maintains the rollers 26 in correct, axially parallel alignment, although the rollers are able to move in their slots 34 to take into account possible uneven movements of the plungers 10 responsive to axial displacement of the actuating member 20. Such uneven movements may result, for example, from uneven wear of the friction elements displaced by the plungers 10 and generally indicated at 40. At the same time, to maintain a proper balance of the braking forces applied by the plungers to the frictional elements, the cage 28 is able to articulate about its pivots 38. As best seen in FIG. 3, these are received in elongate slots 42 of a plug member 44 partially closing an aperture 19 through which the actuator 20 enters the support 18. The elongate nature of the slots 42 permits the cage to move in the direction of the actuator 20, as evident in the right-hand half of FIG. 1, which shows the parts in an operative condition.

When the brake applying force is removed, the actuator 20 is returned upwardly as viewed in FIG. 1 under the action of the normal friction element return spring (not shown), which causes the friction elements to press back upon the plungers 10 and, by virtue of the wedge angle, to act through the rollers 26 on the actuator 20. It will be noted that, between the cylinders 14, the support 16 is internally formed with spaced and oppositely inclined seats 17 against which the free inner end of the actuator 20, correspondingly tapered at 21, is intended to abut in its rest position and by which it is thus centered on each occasion that it is restored from a brake operating position. Moreover, although the same return movement of the several parts mentioned will usually return the rollers 26 to their normal rest positions (as shown at the left-hand side of FIG. 1), this will not necessarily be so if the rollers for some reason become situated significantly out of phase with one another during a brake applying movement. To guard against this possibility, the actuator 20 is provided with laterally directed lugs 23 which, during a return movement of the actuator, are adapted to engage a roller 26 which is in a seriously out-of-phase condition to displace it into an in-phase condition.

By virtue of the construction provided by the invention therefore, the actuator 20 is always centralized in its normal rest position, the rollers are retained in proper axial alignment by both being carried in the cage 28, and the rollers are maintained properly in phase in their rest position by the action of the actuator lugs 23. Thus, whatever positions may be adopted by the rollers and their cage during any particular operation of the brake assembly, they are always repositioned and centralized prior to the next brake operation. In this connection, it will be appreciated that the return movement of the cage is limited by the abutment of the pivots 38 against the end of the guide slots 42. It may also be noted that, as an alternative to the pivots 38 illustrated, those pivots may be substituted by upturned tags pressed out of the cage cheeks 30.

Figure 4:
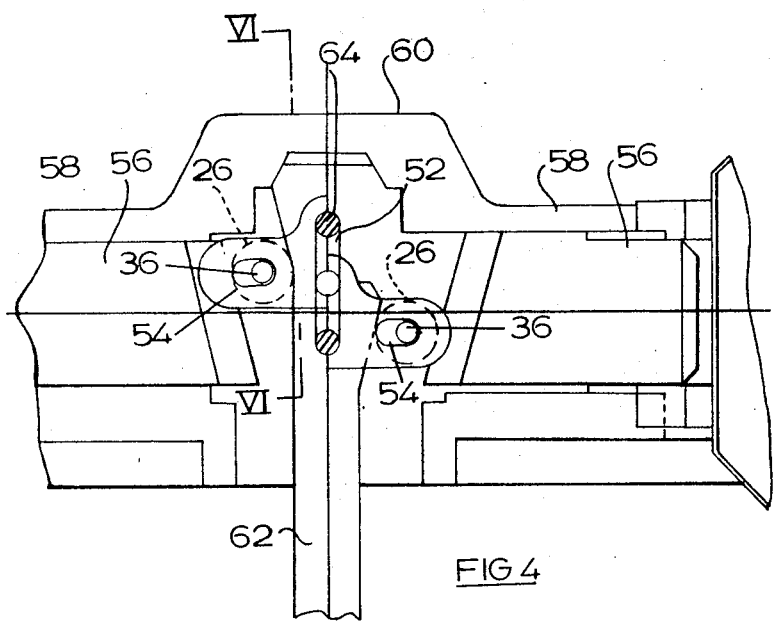
FIG. 4 is a section, similar to that of FIG. 1, of another embodiment of the invention.

FIGS. 4 to 6 show a modification of the invention in which the cage pivots are provided on the actuator member instead of on the cage itself, the cage being formed in two separate, symmetrical halves 50 each having a central elongate slot 52 lying along the line of symmetry and a pair of spaced slots 54 directed transversely to and one on each side of the slot 52. Plungers 56 are arranged in cylinders 58 opening directly from a housing 60, similarly to the preceding embodiment, and a wedge actuator 62 co-operating with rollers 26 positioned between it and the facing plunger ends extends into the housing transversely of the plungers. As shown in FIG. 6, each cage half 50 is positioned alongside the actuator 62 with a roller spindle 36 engaged in each slot 54. The actuator 62 itself is formed with transversely projecting pivots 64 engaging in the cage half slots 52, the elongate character of which permits the cage to move in the direction of the actuator and also to pivot relative thereto.

Figure 7:
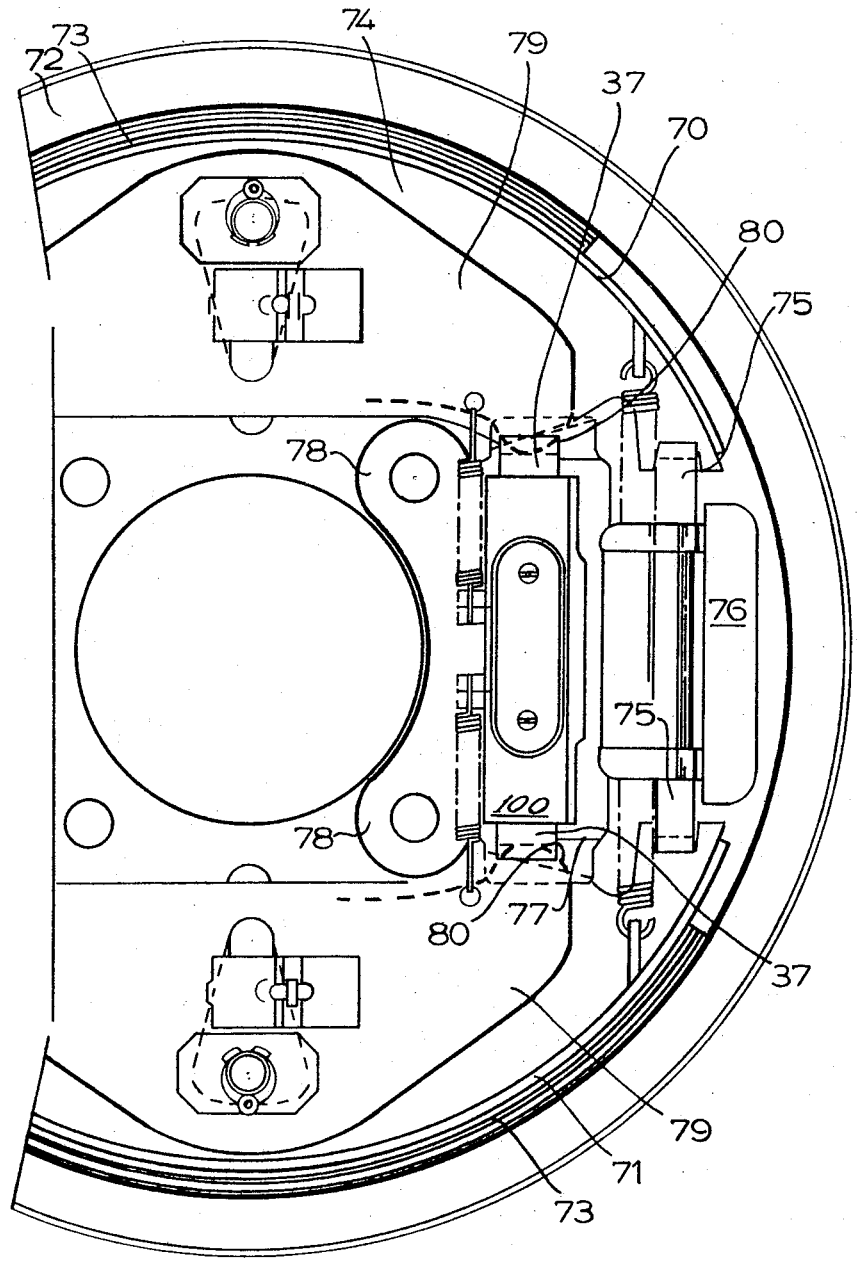
FIG. 7 is a front elevation with parts omitted for clarity, of a drum brake assembly embodying actuating mechanism according to the invention.

In FIG. 7, a mechanical brake actuator such as that described above is shown incorporated in a vehicle drum brake assembly, in which a pair of opposed arcuate brake shoes 70 and 71 are mounted on a stationary backplate 72 and carry friction linings 73 adapted to engage a rotatable brake drum (not shown). Each shoe has a radial web 74, and at the ends of the shoes, the webs 74 are received in notches in the outer ends of tappets 75 having their inner ends engaged with the piston means of conventional hydraulic actuators 76, of which only one actuator is visible in FIG. 7.

The housing 100 of the mechanical actuator is arranged adjacent one of the hydraulic actuators 76 and is bolted to a bracket 77 which in turn is provided with flanges 78 by which it is secured to the backplate 72. The outer ends 37 of the tappets 36 provide abutments for corresponding ends 80 of arcuate carriers or levers 79 located at one side of the shoe webs, and it will be seen that, when the mechanical actuator is operated as already described, the ends 80 of the carriers 79 are separated to move the shoes 70 and 71 into engagement with the brake drum.

We claim:
1. In a vehicle brake assembly comprising a rotor, at least one friction element displaceable towards and away from braking engagement with said rotor, an actuator housing including a support and a pair of opposed cylinders extending from said support, said support being formed with an internal chamber intermediate said cylinders and the latter opening at their inner ends directly into said chamber, a wedge member movable in the support and having a free inner end within said chamber, a plunger member slidable in each cylinder and formed with an inclined inner end, the inclined surfaces of said wedge member being arranged each in spaced relation to a corresponding inner end surface of a plunger member, at least one roller interposed between each inclined surface of the wedge member and the corresponding inner end surface of the co-operating plunger member and a cage retaining and guiding said rollers between said wedge member and said plunger members, said cage being movable in the direction of movement of said wedge member and additionally being capable of articulating about an axis transverse to the wedge member, the improvement comprising pivot pin means on said wedge member, said cage being slotted to engage pivotally on said pin means.

2. A vehicle brake assembly as set forth in claim 1, wherein said cage comprises two separate, symmetrical half cage elements each formed with a central elongate slot lying along the line of symmetry and serving to receive said pivot pin means and each further formed with a pair of spaced slots directed transversely to and lying one on each side of said central slot, each transversely directed slot being engageable by a roller.

3. In a vehicle brake assembly comprising a rotor, at least one friction element displaceable towards and away from braking engagement with said rotor, an actuator housing including a support and a pair of opposed cylinders extending from said support, said support being formed with an internal chamber intermediate said cylinders and the latter opening at their inner ends directly into said chamber, a wedge member movable in the support and having an inner end portion within said chamber, said inner end portion being formed at its free end with symmetrically tapered lateral edges, a plunger member slidable in each cylinder and formed with an inclined inner end and the inclined wedge surfaces of said wedge member diverging towards said free end and being arranged each in spaced parallel relation to a corresponding inner end surface of a plunger member, at least one roller interposed between each inclined wedge surface of the wedge member and the corresponding inner end surface of the co-operating plunger member, whereby movement of said wedge member in a direction outwardly of said support will effect movement of said plunger members outwardly of their cylinders, a cage retaining and guiding said rollers between said wedge member and said plunger members, said cage being movable in the direction of movement of said wedge member and additionally being capable of articulating about an axis transverse to the wedge member, laterally spaced, tapered abutments at one end of said chamber for centering said inner end portion of said wedge member within said chamber, and a laterally directed shoulder on each side of said wedge member immediately behind said inner end portion to constitute a seating for the rollers in a rest position thereof.

References Cited
UNITED STATES PATENTS

| | | | |
|---|---|---|---|
| 3,037,584 | 6/1962 | Cox et al. | 188—78 |
| 3,139,762 | 7/1964 | Alfieri | 188—152 X |

FOREIGN PATENTS

| | | |
|---|---|---|
| 785,248 | 5/1952 | France. |
| 928,181 | 6/1963 | Great Britain. |
| 952,860 | 3/1964 | Great Britain. |

MILTON BUCHLER, *Primary Examiner.*

B. S. MOWRY, T. W. BUCKMAN, *Assistant Examiners.*